US012766605B2

(12) United States Patent
Collado Cipres et al.

(10) Patent No.: US 12,766,605 B2
(45) Date of Patent: *Oct. 20, 2026

(54) GRADIENT CEMENTED CARBIDE WITH ALTERNATIVE BINDER

(71) Applicant: AB SANDVIK COROMANT, Sandviken (SE)

(72) Inventors: Veronica Collado Cipres, Stockholm (SE); Jose Luis Garcia, Stockholm (SE)

(73) Assignee: AB Sandvik Coromant, Sandviken (SE)

( * ) Notice: Subject to any disclaimer, the term of this patent is extended or adjusted under 35 U.S.C. 154(b) by 1047 days.

This patent is subject to a terminal disclaimer.

(21) Appl. No.: 17/785,968

(22) PCT Filed: Dec. 15, 2020

(86) PCT No.: PCT/EP2020/086110

§ 371 (c)(1),
(2) Date: Jun. 16, 2022

(87) PCT Pub. No.: WO2021/122520

PCT Pub. Date: Jun. 24, 2021

(65) Prior Publication Data

US 2023/0023716 A1 Jan. 26, 2023

(30) Foreign Application Priority Data

Dec. 19, 2019 (EP) .................................... 19217914

(51) Int. Cl.
*B23B 27/14* (2006.01)
*C22C 29/06* (2006.01)
(Continued)

(52) U.S. Cl.
CPC .......... *B23B 27/148* (2013.01); *C22C 29/067* (2013.01); *C22C 29/08* (2013.01); *C23C 8/20* (2013.01)

(58) Field of Classification Search
CPC .................................................... C22C 29/067
See application file for complete search history.

(56) References Cited

U.S. PATENT DOCUMENTS 4,843,039 A * 6/1989 Akesson ................ C22C 29/02 428/404
5,041,261 A 8/1991 Buljan et al.
(Continued)

FOREIGN PATENT DOCUMENTS

EP 0246211 A2 11/1987
JP S60135552 A 7/1985
(Continued)

OTHER PUBLICATIONS

Xiaoqiang Li et al. "Preparation and mechanical properties of WC-10Ni3Al cemented carbides with plate-like triangular prismatic WC grains", Journal of Alloys and Compounds, vol. 544, Aug. 4, 2012, pp. 134-140.
(Continued)

*Primary Examiner* — Christopher S Kessler
(74) *Attorney, Agent, or Firm* — Corinne R. Gorski

(57) ABSTRACT

A cemented carbide having an eta phase and a Ni—Al binder is provided. The binder includes intermetallic γ'-$Ni_3Al$-precipitates embedded in a substitutional solid solution matrix including Al and Ni. Further, the cemented carbide has a surface zone free from eta phase. A method of making a cutting tool is also provided.

15 Claims, 1 Drawing Sheet

(51) Int. Cl.
*C22C 29/08* (2006.01)
*C23C 8/20* (2006.01)

(56) References Cited

U.S. PATENT DOCUMENTS

| | | | | |
|---|---|---|---|---|
| 11,850,663 B2 * | 12/2023 | Garcia | .................... | C22C 29/08 |
| 2019/0358707 A1 * | 11/2019 | Garcia | .................... | C22C 29/08 |

FOREIGN PATENT DOCUMENTS

| | | |
|---|---|---|
| WO | 2017108610 A1 | 6/2017 |
| WO | 2018162558 A1 | 9/2018 |

OTHER PUBLICATIONS

Viswanadham et al. “Preparation and Properties of WC-(NI, Al) Cemented Carbides” In: “Science of Hard Materials”, Jan. 1, 1983, Springer, US, Boston, MA, p. 875-878.

* cited by examiner

GRADIENT CEMENTED CARBIDE WITH ALTERNATIVE BINDER

RELATED APPLICATION DATA

This application is a § 371 National Stage Application of PCT International Application No. PCT/EP2020/086110 filed Dec. 15, 2020 claiming priority to EP 19217914.1 filed Dec. 19, 2019.

The present invention relates to a cutting tool and a method of making a cutting tool comprising a cemented carbide substrate comprising tungsten carbide and a binder where the binder comprises γ'-precipitates in a substitutional solid solution matrix and wherein the cemented carbide comprises eta phase. Further, the cemented carbide comprises a surface zone free from eta phase and with less binder than in the inner part of the cemented carbide.

BACKGROUND

Cemented carbides based on tungsten carbide (WC) with a cobalt binder have been known in the art since the twenties. Other metals that are known as binder metals in cemented carbides are iron and nickel, however cobalt is by far the most used.

It is an ongoing strive to find alternative binders to cobalt due to its environmental and health impact. However, it is difficult to replace or limit the amount of cobalt without impacting material properties in a negative way. For cutting tools the substrate properties are important for the overall performance of the tool and even small changes in composition can have a detrimental impact on performance.

Nickel presents good wettability to WC making it suitable to produce cemented carbides. Ni also present better performance in oxidation and corrosion conditions compared to WC—Co cemented carbides. The major drawback of Ni-based cemented carbides is their reduced mechanical strength. One reason is the higher stacking fault energy of Ni compared to Co, which makes work hardening of Ni only moderate as compared to Co.

To overcome the performance shortcomings of WC—Ni cemented carbides different methods to increase strength and/or hardness have been proposed; for example to fabricate sub-micrometer or close-to-nano WC—Ni cemented carbides (Hall-Petch relationship) by inhibiting the growth of WC grains during sintering; or to add some elements which promote high strength and/or high hardness into the matrix of WC—Ni cemented carbides.

Ni—Al binders as such are known for cemented carbides. $Ni_3Al$ is an intermetallic with high hardness and melting point. Cemented carbides made of WC embedded in $Ni_3Al$ binder have been reported to have high hardness and reduced toughness, making them less suitable for cutting tool substrates. Therefore, in order to achieve a binder with the aimed properties (comparable to cobalt), the NiAl binder needs to be optimized.

Eta phase can act as a reinforcement of the WC-binder composite to improve the hardness/toughness ratio of such cemented carbide. However, in some applications, the hardness/toughness of the cemented carbide in the near-surface still needs to be optimized.

It is an object of the invention to provide a cemented carbide with an alternative binder phase which has equal or improved properties as compared to a substrate with a Co binder.

It is also an object of the invention to provide a cemented carbide with a NiAl binder where the formation of the γ'-$Ni_3Al$-precipitates in the NiAl binder can be controlled in the manufacturing process.

It is also an object of the present invention to design a cemented carbide that can both benefit from the advantages from eta phase but where the eta phase can be removed from the surface zone where it is not always desired, to produce a functionally graded (in microstructure and properties) cemented carbide.

DETAILED DESCRIPTION OF THE INVENTION

Figure 1:
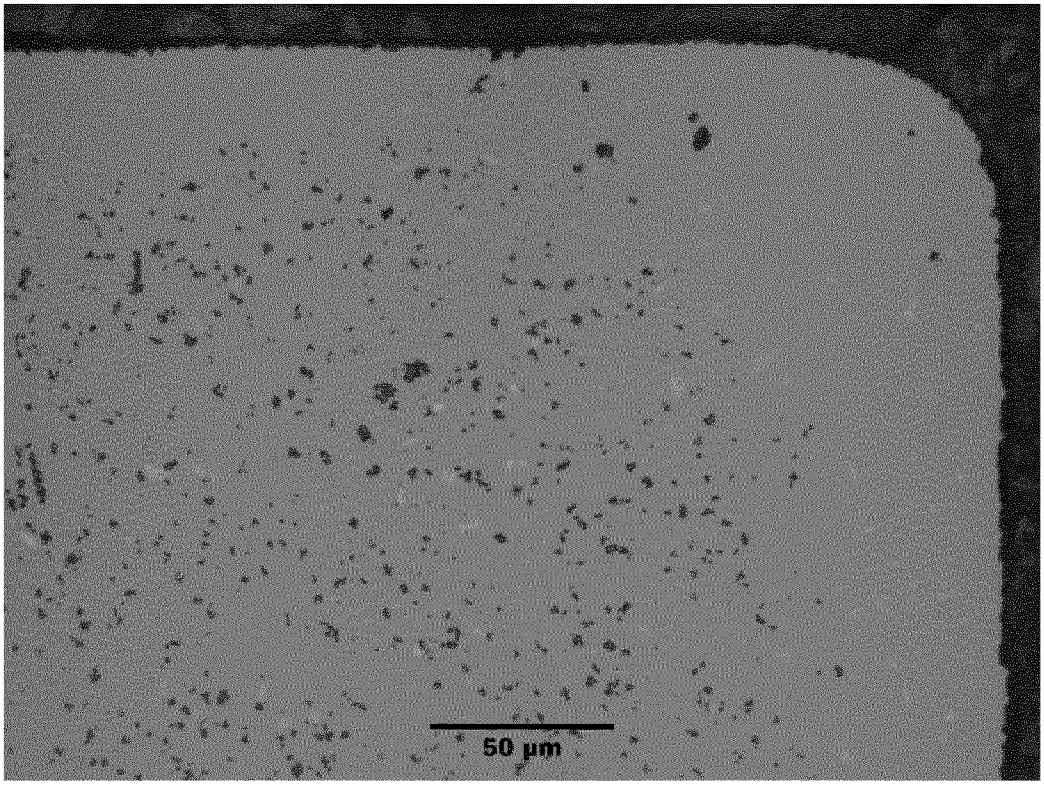
FIG. 1 is a LOM image showing the gradient surface zone free from eta phase.

The present invention relates to a cutting tool comprising a cemented carbide substrate comprising WC and 3 to 20 wt % binder. The binder comprises intermetallic γ'-$Ni_3Al$-precipitates embedded in a substitutional solid solution matrix comprising Al and Ni with a weight ratio Al/Ni is between 0.02 and 0.15 and wherein the total amount of Ni and Al is between 70 and 95 wt % of the binder. The cemented carbide further comprises an inner part and a surface zone with a depth of between 5 and 400 μm; wherein the inner part comprises eta phase in an amount so that the volume fraction eta phase is between 1 and 30 vol % and wherein the gradient surface zone is free from eta phase.

It has been discovered that by sintering a cemented carbide with a NiAl binder (with dispersed $Ni_3Al$ precipitates in the binder) and eta phase in a carburizing atmosphere the eta phase can be dissolved on the surface of the cemented carbide producing a graded composition within the sintered body with two distinct regions, one containing eta phase (inner part) and another without eta phase (surface zone). The process also produces a redistribution of binder phase, being less on the eta phase free surface compared to the inner part.

According to the present invention, the gradient surface zone is free from eta phase. The thickness of the gradient surface zone is suitably between 5 and 400 μm, preferably between 50 and 250 μm. The gradient surface zone is defined as the area between the surface of the tool and the point where the eta phase starts to be present in the microstructure, i.e. where the inner part starts. Eta phase is most visible in a cross section polished surface of an etched cemented carbide (10% Murakami solution, 1 sec.) by LOM.

The thickness is determined by measuring on a SEM or LOM image of a cross section of the substrate. Those measurements should be performed in areas where the substrate surface is reasonably flat, i.e. not close to the edge, at least 0.3 mm from the cutting edge, or nose etc. in order to get a true value.

The gradient surface zone according to the present invention does not have an enrichment of eta phase in the corners, i.e. the depth of the gradient surface is reasonably equal around the cutting tool indicating that the gradient formation is driven by carbon in-diffusion.

In one embodiment of the present invention, the binder phase content in the gradient surface zone is lower than the binder phase content in the inner part of the cemented carbide. The binder phase content in the gradient surface zone is suitably 0.2 to 0.9 of the binder phase content in the bulk. The binder phase content in the gradient surface zone is preferably measured in the middle of the gradient surface zone, i.e. not close to the surface or the boundary where the eta phase starts to appear. One way to measure the binder phase content is by Microprobe Jeol JXA8530F with an EDS/WDS detector. The boundary where the binder phase content no longer changes is not necessarily at exactly the same depth as the depth of the gradient surface zone defined by where the eta phase is. This “binder phase surface gradient zone” defined by the binder phase content can either have a smaller or larger depth than the gradient surface zone defined by the eta phase depending on processing parameters.

By intermetallic γ'-$Ni_3Al$-precipitate is herein meant a semi-coherent precipitate with a cubic crystal structure (space group Pm-3m) that differs from the surrounding binder in that the Al atoms preferentially occupy the 1a sites, while the solid solution binder exhibits random elemental occupancy on all sites.

By a substitutional solid solution is herein meant a solid solution in which the solvent and solute atoms are located randomly at the lattice sites in the crystal structure of the phase. Elements such as C and N may also be present, but on interstitial sites.

Suitably, the average grain size of the γ'-$Ni_3Al$ precipitates is between 10 and 1000 nm, preferably between 10 and 500 nm. The grain size of the precipitates is suitably measured by image analysis in a SEM image of a cross section using the mean linear intercept method.

The γ'-$Ni_3Al$ precipitates are preferably present in both the gradient surface zone and in the inner part of the cemented carbide.

In one embodiment of the present invention, the average grain size of the γ'-$Ni_3Al$ precipitates in the gradient surface zone is smaller than the average grain size of the γ'-$Ni_3Al$ precipitates in the inner part of the cemented carbide. Preferably, the average grain size of the γ'-$Ni_3Al$ precipitates in the gradient surface zone is less than 80% of the average grain size of the γ'-$Ni_3Al$ precipitates in the inner part of the cemented carbide.

The amount of binder is preferably between 3 and 20 wt % of the cemented carbide, preferably 5 and 15 wt %.

The weight ratio between Al/Ni is suitably between 0.02 and 0.15, preferably between 0.03 and 0.10 and more preferably 0.03 and 0.07.

The amount of Ni and Al is suitably from 70 to 95 wt % of the binder, preferably from 80 to 95 wt %. The remaining part of the binder will be Tungsten (W) that is dissolved in the binder during sintering and possibly also other elements if added like e.g. Cr.

The binder always comprises certain amounts of W and C which are dissolved during sintering process from the WC. The exact amount is dependent on the overall composition of the cemented carbide.

The cemented carbide comprises eta phase in the inner part of the cemented carbide. By eta phase is herein meant carbides selected from $Me_{12}C$ and $Me_6C$ where Me is selected from W, and one or more of the binder phase metals.

The distribution of the eta phase in the cemented carbide should be as even as possible in parts of the cemented carbide where it is present, i.e. the inner part.

In one embodiment of the present invention, the volume fraction of the eta phase in the inner part of the cemented carbide is suitably between 1 and 30 vol %, preferably between 1.5 and 15 vol %, more preferably between 3 and 10 vol % and even more preferably between 3 and 6 vol %. Eta phase is most visible in a cross section polished surface of an etched cemented carbide (10% Murakami solution, 1 sec.) by LOM. The amount of eta phase is preferably measured by image analysis. It should also be avoided to do the measurement close to the boundary to the gradient surface zone.

The average grain size of the eta phase precipitates is quite difficult to measure since the eta phase grains are not round, in some cases they look like flowers. The size of the eta phase precipitates depends on both the WC grain size and the amount of binder in the cemented carbide. The size of the eta phase precipitates in the inner part of the cemented carbide is preferably between 0.1 and 10 μm, more preferably between 0.1 and 3 μm and most preferably 0.1 and 1 μm. This can be measured in different ways, e.g. by mean linear intercept on a SEM/LOM image.

The eta phase in the inner part of the cemented carbide is well distributed in a suitable amount which is necessary to obtain the improved properties. A well distributed eta phase is achieved by keeping the carbon content within certain limits. This is achieved by controlling the carbon balance carefully during manufacturing. By well distributed is herein meant that the cemented carbide is free from large clusters of particles.

If the carbon content is too low, large amounts of eta phase will form. In practice, the maximum amount of eta phase that is desired in the cemented carbide depends on the specific application of the cutting tool. Increasing the amount of eta phase too much can lead to that the cemented carbide becomes brittle. Hence, as a guidance, there should not be more than 30 vol % eta phase, preferably no more than 15 vol % in the cemented carbide.

If the carbon content is close to the limit where eta phase stops to form, there is a risk that the formed eta phase will be unevenly distributed, i.e. located in large clusters. This might be undesired for certain applications. The difference in carbon content between achieving the unwanted large clusters of eta phase and achieving the finely distributed eta phase that is aimed for, can be very small. Being close to that limit requires monitoring the microstructure to make sure that the unwanted large clusters are avoided. The limit for when finely distributed eta phase is achieved depends on the overall composition of the cemented carbide as it is known for a person skilled in the art.

In one embodiment of the present invention the cemented carbide is essentially free from Co and by that is herein meant that no Co is added as raw material and that Co present in the cemented carbide is on a level of impurity, preferably below 1 wt %, more preferably below 0.5 wt %. Small amounts of Co are usually detected since some manufacturing equipment, like e.g. milling bodies, contains cemented carbide and can give a small contribution to the overall composition.

In one embodiment of the present invention the cemented carbide is essentially free from Mo and by that is herein meant that no Mo is added as raw material and that Mo is present in the cemented carbide on a level of an impurity, preferably below 1 wt % for Mo.

Mo is here not wanted in the material since it may dissolve in the WC, altering its properties, or form sub-carbides with a coarse structure akin to that of the binder, which is severely embrittling.

The term “cemented carbide” is herein intended to denote a material comprising hard constituents in a metallic binder phase, wherein the hard constituents comprise at least 50 wt % WC grains. The hard constituents can also comprise carbides or carbonitrides of one or more of Ta, Ti, Nb, Cr, Hf, V and Zr, such as TiN, TiC and/or TiCN.

The average grain size of the WC is suitably between 0.2 and 10 μm, preferably between 0.4 and 5 μm an more preferably between 0.4 and 2 μm. The grain size can be measured by e.g. mean linear intercept method etc.

In one embodiment of the present invention, the cemented carbide substrate is provided with a wear resistant CVD (Chemical vapor deposition) or PVD (Physical vapor deposition) coating.

In one embodiment of the present invention, the cemented carbide substrate is provided with a wear resistant PVD coating, suitably being a nitride, oxide, carbide or mixtures thereof of one or more of the elements selected from Al, Si and groups 4, 5 and 6 in the periodic table.

In yet another embodiment of the present invention, the cemented carbide substrate is provided with a wear resistant CVD coating.

In yet another embodiment of the present invention, the cemented carbide substrate is provided with a wear resistant CVD coating comprising several layers, suitably at least a carbonitride layer and an $Al_2O_3$ layer.

By cutting tool is herein meant an insert, end mill or drill.

The present invention also relates to a method of making a cutting tool according to the above comprising a cemented carbide substrate as described above. The method comprises the following steps:

- providing powders forming hard constituents comprising WC,
- providing powders containing Ni and Al forming the binder phase,
- adjusting the carbon content with addition of W and/or $W_2C$ so that eta phase will be formed after sintering,
- milling said powders together with a milling liquid, drying said powders and pressing the powders into a green body,
- subjecting the green body to a sintering step,
- wherein the method further comprises a carburizing step.

By carburizing step is herein meant that the green body or sintered cemented carbide is subjected to a carburizing atmosphere at an elevated temperature. This can be achieved by introducing any carbon containing gas or gas mixture, for example CO, CH4, etc.

The carburizing step can be performed either before, during or after the liquid sintering step, preferably during a temperature interval between the temperature for the liquid phase sintering, $T_{liq}$, and the solidification temperature, $T_{sol}$. The two temperatures $T_{liq}$ and $T_{sol}$ are both referring to the liquidus and solidus temperatures for the binder, i.e. not for the WC. Preferably, the carburizing step takes place at a temperature between 1340 and 1430° C., more preferably between 1350 and 1420° C. The carburizing step is done by introducing a carbon rich atmosphere using a gas such as e.g. CO, $CH_4$ (or mixtures of them). Other protective gases that do not take part in the carburization step such as $N_2$, Ar, etc. can be also introduced together with the carbon gas source. Typical carburizing (CO) partial pressures may range between 50 and 900 mbar depending on intended gradient thickness. The duration of the carburizing step is suitably between 15 minutes to 4 hours, preferably between 40 minutes and 3 hours. By duration is herein meant the time at the which the carburizing environment is present and the temperature is above the solidification temperature, $T_{sol}$.

Depending on the desired gradient thickness, the partial pressure of carbon containing gases and/or the duration of the carburizing step has to be adjusted.

In one embodiment of the present invention, the carburizing step is a part of the sintering cycle. By sintering cycle is herein meant the sintering of the green body into a sintered cemented carbide body, which is done by including a liquid sintering step.

In one embodiment of the present invention, the carburizing step is done after the liquid phase step of the sintering process. The carbon containing gas is then introduced during the cooling step. Within the desired temperature range (between solidus to liquidus temperature for the binder) the cooling rate is adjusted to control the diffusion and transport process and hence adjust the rate of dissolution of eta phase, binder transport and gradient thickness. The carbon activity, adjusted by the carbon partial pressure, in the surface of the cemented carbide during the carburizing process also controls the rate of transformation and gradient formation.

In one embodiment of the present invention, the carburizing step takes place in a separate sintering process. Then an already sintered cemented carbide made according to the process described above, but without the carburizing step, is introduced into a sintering furnace. Then it is subjected to a second sintering process including a carburizing step as has been described above.

When adjusting the amount of eta phase, which is done by adjusting the carbon balance towards a lower carbon content by adding e.g. W, or $W_2C$, it is up to the person skilled in the art to determine the correct raw material composition in order to obtain the desired amount of eta phase after sintering. To some extent, the desired carbon content can be estimated or calculated from the phase diagram for a particular cemented carbide composition. However, it is also well known that a certain amount of carbon is lost due to the presence of oxygen, which reacts with carbon, during sintering. Therefore, a certain excess of carbon has to be present in order to compensate for this loss. How much carbon that is lost during sintering is dependent on many things like e.g. type of furnace, oxygen content in the raw materials etc.

The raw materials containing Ni and Al forming the binder phase can be added as pure metals, alloys of two or more metals or as carbides, nitrides or carbonitrides thereof. The raw materials should be added in such amounts so that the binder phase, after sintering will have the composition as has been described above.

The powders forming hard constituents comprise WC, preferably with an average grain size of 0.2-10 μm, more preferably 0.4-5 μm.

Any liquid commonly used as a milling liquid in conventional cemented carbide manufacturing can be used. The milling liquid is preferably one or more of water, alcohol or an organic solvent. Also, other compounds commonly known in the art can be added to the slurry e.g. dispersion agents, pH-adjusters etc. An organic binder, e.g. paraffin, polyethylene glycol (PEG), long chain fatty acids etc., is also optionally to function as a pressing agent.

The raw material powders and milling liquid is then subjected to a milling operation in a suitable mill, like e.g. a ball mill or attritor mill.

The milled slurry is then dried by spray drying to form agglomerated granules. For small scale experiments, also other drying methods can be used, e.g. pan drying.

Green bodies are subsequently formed from the dried powders/granules by a pressing operation such as uniaxial pressing, multiaxial pressing etc.

The green bodies formed from the powders/granules made according to the present invention, is subsequently sintered according to any conventional sintering methods e.g. vacuum sintering, Sinter HIP, gas pressure sintering (GPS) etc.

The sintering is suitably performed at liquid phase temperatures. The exact temperature depends on the exact composition of the binder.

In one embodiment of the present invention, the sintering temperature is between 1350 and 1550° C.

In one embodiment of the present invention the cemented carbide substrates are provided with a coating.

In one embodiment of the present invention the cemented carbide substrates made according to the above, are provided with a wear resistant coating according to the above using CVD or PVD-technique.

The coating can also be subjected to additional treatments, such as brushing, blasting etc.

The present invention also discloses a cemented carbide cutting tool made according to the method described above.

Example 1

A cemented carbide is made by providing raw materials according to Table 1. The average particle size of the WC powder was 1.42 μm. The powders are mixed with an ethanol/water milling liquid and polyethylene glycol. The slurry is then milled, dried and subsequently pressed into green bodies. The green bodies were then placed in a sintering furnace and sintered at 1500° C. (liquid phase sintering) for 1 h.

The sintered pieces were then subjected to a second sintering process where a liquid phase sintering step was performed at 1430° C., during which a partial pressure of CO of 200 mBar was used to create a carburizing atmosphere. The duration of the carburizing step was 120 minutes. After that, the pieces were cooled down to room temperature in the furnace.

TABLE 1

| | Ni95Al5 (wt %) | WC (wt %) | W (wt %) |
|---|---|---|---|
| Invention 1 | 6 | 92.6 | 1.4 |

The microstructure of the sintered cemented carbide were then investigated. First, a cross section was prepared and the cemented carbide was etched for 1 second by using 10% Murakami solution. The thickness of the gradient surface zone free of eta phase was measured on a LOM image at 500×, see FIG. 1. The vol % eta phase in the inner part was also measured using image analysis on the LOM image with the software image J.

Figure 2:
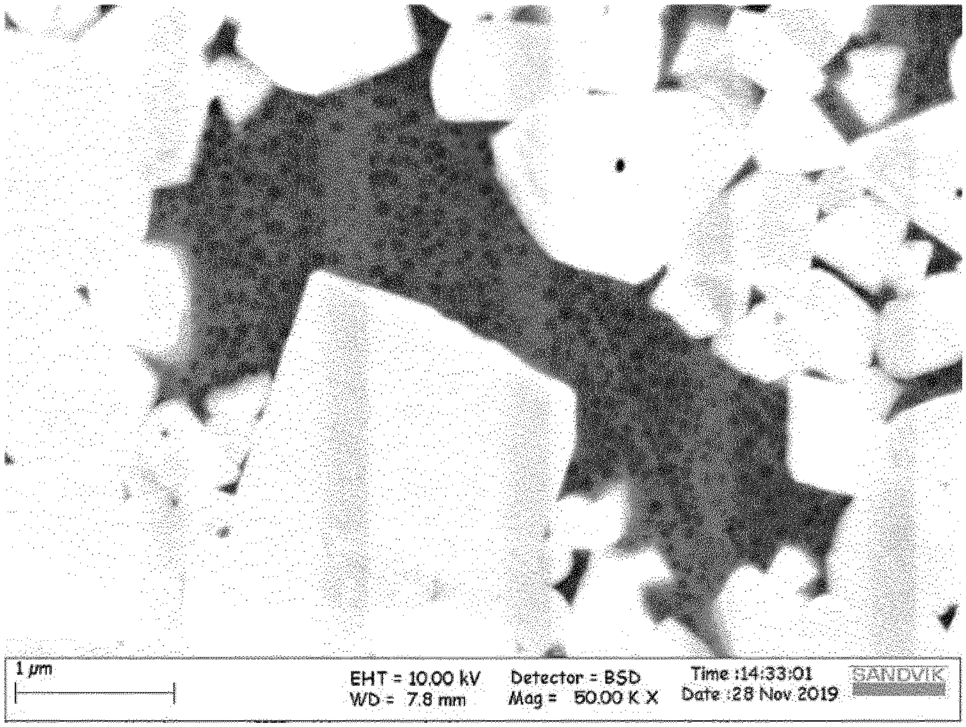
FIG. 2 is a SEM image showing how the γ'-$Ni_3Al$-precipitates are embedded in the NiAl binder in the inner part.

On a SEM image, the presence and size of the γ' precipitates were measured. The precipitates were present in both the inner part (bulk) as well as in the gradient surface zone. In FIG. 2, the γ' precipitates in the binder can be seen in the inner part of the cemented carbide. It was also observed that the size of the precipitates in the gradient surface zone was smaller than in the inner part of the cemented carbide. The size of the γ' precipitates was done manually using the mean linear intercept method.

TABLE 2

| | Vol % eta bulk | Surface zone (μm) | γ' (nm) bulk | γ' (nm) surface zone |
|---|---|---|---|---|
| Invention 1 | 5.5 | 25-43 | 100 | 37 |

The invention claimed is:

1. A cutting tool comprising a cemented carbide substrate comprising tungsten carbide and 3 to 20 wt % binder and wherein the binder includes intermetallic y'-$Ni_3Al$-precipitates embedded in a substitutional solid solution matrix including Al and Ni with a weight ratio Al/Ni of between 0.02 and 0.15, wherein a total amount of Ni and Al is between 70 to 95 wt % of the binder and wherein the cemented carbide includes an inner part and a gradient surface zone with a depth of between 5 and 400 μm wherein the inner part includes eta phase in an amount so that a volume fraction eta phase is between 1 and 30 vol % and wherein the gradient surface zone is free from eta phase.

2. The cutting tool according to claim 1, wherein an average grain size of the intermetallic y'-$Ni_3Al$-precipitates is between 10 and 1000 nm.

3. The cutting tool according to claim 1, wherein an average grain of the intermetallic y'-$Ni_3Al$-precipitates is between 10 and 500 nm.

4. The cutting tool according to claim 1, wherein an average grain of the intermetallic y'-$Ni_3Al$-precipitates are smaller in the gradient surface zone than in the inner part of the cemented carbide.

5. The cutting tool according to claim 1, wherein the weight ratio between Al/Ni is between 0.03 and 0.07.

6. The cutting tool according to claim 1, wherein the total amount of Ni and Al is between 80 and 95 wt % of the binder.

7. The cutting tool according to claim 1, wherein the amount of eta phase in the inner part of the cemented carbide is between 3 and 10 vol %.

8. The cutting tool according to claim 1, wherein the binder content in the surface zone is less than in the inner part of the cemented carbide.

9. The cutting tool according to claim 1, wherein the cemented carbide is essentially free of Co.

10. The cutting tool according to claim 1, wherein the cemented carbide is essentially free of Mo.

11. A method of making a cutting tool according to claim 1, the method comprising the steps of:

providing powders forming hard constituents including WC;

providing powders containing Ni and Al forming the binder phase;

adjusting carbon content with addition of W and/or $W_2C$ so that an eta phase will be formed after sintering;

milling said powders together with a milling liquid, drying said powders and pressing the powders into a green body;

subjecting the green body to a sintering step; and further comprising a carburizing step.

12. The method of making a cutting tool according to claim 11, wherein a temperature of the carburizing step is between a temperature for the liquid phase sintering $T_{liq}$ and a solidification temperature $T_{sol}$ of the binder.

13. The method of making a cutting tool according to claim 11, wherein a gas during the carburizing step is CO or $CH_4$.

14. The method of making a cutting tool according to claim 11, wherein the temperature of the carburizing step is between 1340 and 1430° C. and the duration of the carburizing step is between 15 minutes to 4 hours.

15. The method of making a cutting tool according to claim 11, wherein the cutting tool is provided with a wear resistant CVD or PVD coating.

* * * * *